United States Patent
Yang et al.

(10) Patent No.: US 11,022,980 B2
(45) Date of Patent: Jun. 1, 2021

(54) COMMUNICATION RELATIONSHIP ESTABLISHING METHOD AND DEVICE, COMPUTER READABLE STORAGE MEDIUM, ELECTRONIC DEVICE AND CLEANING DEVICE

(71) Applicant: Shenzhen 3irobotix Co., Ltd., Guangdong (CN)

(72) Inventors: Yong Yang, Guangdong (CN); Zexiao Wu, Guangdong (CN); Yuhui Song, Guangdong (CN)

(73) Assignee: Shenzhen 3irobotix Co., Ltd., Guangdong (CN)

( * ) Notice: Subject to any disclaimer, the term of this patent is extended or adjusted under 35 U.S.C. 154(b) by 0 days.

(21) Appl. No.: 16/767,431

(22) PCT Filed: Jan. 23, 2018

(86) PCT No.: PCT/CN2018/073737
§ 371 (c)(1),
(2) Date: May 27, 2020

(87) PCT Pub. No.: WO2019/104855
PCT Pub. Date: Jun. 6, 2019

(65) Prior Publication Data
US 2020/0379470 A1    Dec. 3, 2020

(30) Foreign Application Priority Data
Nov. 28, 2017    (CN) .......................... 201711215140.0

(51) Int. Cl.
G05D 1/02    (2020.01)
A47L 9/28    (2006.01)
(Continued)

(52) U.S. Cl.
CPC .......... G05D 1/0219 (2013.01); A47L 9/2852 (2013.01); A47L 9/2894 (2013.01);
(Continued)

(58) Field of Classification Search
CPC .. G05D 1/0242; G05D 1/0255; G05D 1/0272; G05D 1/0274; G05D 2201/0203;
(Continued)

(56) References Cited

U.S. PATENT DOCUMENTS 8,705,842 B2 *  4/2014  Lee ....................... G05D 1/0274
                                                382/153
8,880,271 B2 * 11/2014  Jeon ........................ A47L 9/009
                                                701/25
(Continued)

FOREIGN PATENT DOCUMENTS

CN    101101203 A    1/2008
CN    104615138 A    5/2015
(Continued)

OTHER PUBLICATIONS

China Office Action, Application No. 201711215140.0, dated Apr. 21, 2020, 6 pages.
(Continued)

*Primary Examiner* — Bhavesh V Amin
(74) *Attorney, Agent, or Firm* — Ziegler IP Law Group, LLC (57) ABSTRACT

Provided are communication relationship establishing method and device, computer readable storage medium, electronic device, and cleaning device. The method includes: first dividing-to-be-cleaned area into at least two to-be-cleaned sub-areas, and then classifying, according to area, a large to-be-cleaned sub-area and a small to-be-cleaned sub-area; acquiring a boundary line between the large to-be-cleaned sub-area and the small to-be-cleaned
(Continued)

sub-area; extending the boundary line and determining whether the extended boundary line can divide the large to-be-cleaned sub-area; and if yes, dividing the large to-be-cleaned sub-area into a first to-be-cleaned sub-area on the same side of the boundary line as the small to-be-cleaned sub-area and a second to-be-cleaned sub-area on the different side of the boundary line from the small to-be-cleaned sub-area, and respectively establishing communication relationships between the small to-be-cleaned sub-area and the first to-be-cleaned sub-area and between the small to-be-cleaned sub-area and the second to-be-cleaned sub-area.

15 Claims, 5 Drawing Sheets

(51) Int. Cl.
  *G05B 19/4155* (2006.01)
  *G01C 21/20* (2006.01)
(52) U.S. Cl.
  CPC ...... *G05B 19/4155* (2013.01); *A47L 2201/04* (2013.01); *G01C 21/206* (2013.01); *G05B 2219/2642* (2013.01); *G05B 2219/45098* (2013.01); *G05D 2201/0215* (2013.01)
(58) Field of Classification Search
  CPC .. G05D 1/0246; G05D 1/0219; G05D 1/0234; G05D 1/027; G05D 1/0227; G05D 2201/0215; G05D 1/024; G05D 1/0225; G05D 1/0253; G05D 1/0088; G05D 1/0238; G05D 2201/0208; G05D 1/0094; G05D 1/0217; G05D 1/0248; G05D 1/0257; G05D 1/0259; G05D 1/0261; G05D 1/0263; G05D 1/0265; G05D 1/0276; G05D 1/0282; G05D 1/0297; G05D 2201/0209; G05D 2201/0216; A47L 2201/04; A47L 9/009; A47L 9/2805; A47L 9/2852; A47L 2201/00; A47L 9/2857; A47L 9/2894; A47L 9/2884; A47L 11/00; A47L 5/14; A47L 7/04; A47L 9/08; A47L 9/28; A47L 9/281; A47L 9/2826; A47L 9/2873; G01C 21/20; G01C 21/34; G01C 22/00; G01C 19/00; G01C 21/12; G01C 21/206; G01C 25/00; G01S 5/005; G06T 7/73; G06T 7/0004; G06T 7/20; G06T 19/003; G06T 2207/30164; G06T 3/60; G06T 7/0002; G06T 7/0006; B25J 9/1694; B25J 11/0085; B25J 9/163; B25J 9/1661; B25J 9/1679; G01S 1/70; G01S 2201/01; G01S 5/16; G01S 13/867; G01S 19/42; G01S 1/7032; G01S 1/7034; G01S 1/7038; G01S 2013/9323; G06F 16/29; G06F 16/24; G06F 16/24578; G06F 16/444; G06F 16/5866; G06K 9/00771; G06K 9/6201; G06K 2209/21; G06K 9/00664; G06K 9/00805; G06K 9/2054; G06K 9/209; G06K 9/4604; G06K 9/4609; G06K 9/6202; G06K 9/78; C12P 17/10; C12P 41/005; C12P 7/40; Y10S 435/921; A41D 19/01535; B23K 26/06; B23K 26/0604; B23K 26/0643; C01B 25/027; C01B 25/20; H05B 2203/003; H05B 2203/014; H05B 2203/017; H05B 2203/036; H05B 3/342
  See application file for complete search history.

(56) References Cited

U.S. PATENT DOCUMENTS

| | | | | |
|---|---|---|---|---|
| 10,488,865 B2* | 11/2019 | Afrouzi | ............... | G05D 1/0217 |
| 2002/0153184 A1* | 10/2002 | Song | ............... | A47L 9/2884 |
| | | | | 180/167 |
| 2008/0249661 A1* | 10/2008 | Hong | ............... | G05D 1/0219 |
| | | | | 700/252 |
| 2008/0273791 A1* | 11/2008 | Lee | ............... | G05D 1/0274 |
| | | | | 382/153 |
| 2008/0294338 A1* | 11/2008 | Doh | ............... | G05D 1/0234 |
| | | | | 701/533 |
| 2009/0055020 A1* | 2/2009 | Jeong | ............... | G05D 1/0272 |
| | | | | 700/251 |
| 2009/0149990 A1* | 6/2009 | Myeong | ............... | G05D 1/0274 |
| | | | | 700/245 |
| 2009/0182464 A1* | 7/2009 | Myeong | ............... | G05D 1/0246 |
| | | | | 701/25 |
| 2010/0211244 A1* | 8/2010 | Jeong | ............... | G06T 19/003 |
| | | | | 701/25 |
| 2011/0125324 A1* | 5/2011 | Baek | ............... | G05D 1/0274 |
| | | | | 700/258 |
| 2012/0106829 A1* | 5/2012 | Lee | ............... | G05D 1/0274 |
| | | | | 382/153 |
| 2012/0232738 A1* | 9/2012 | Jeon | ............... | A47L 9/009 |
| | | | | 701/25 |
| 2013/0006419 A1* | 1/2013 | Bergstrom | ............... | A01D 34/008 |
| | | | | 700/245 |
| 2013/0056032 A1* | 3/2013 | Choe | ............... | G05D 1/0044 |
| | | | | 134/18 |
| 2013/0138246 A1* | 5/2013 | Gutmann | ............... | G05D 1/0274 |
| | | | | 700/253 |
| 2013/0206177 A1* | 8/2013 | Burlutskiy | ............... | G05D 1/0219 |
| | | | | 134/18 |
| 2015/0323934 A1* | 11/2015 | Lin | ............... | G01S 5/02 |
| | | | | 701/26 |
| 2016/0135655 A1* | 5/2016 | Ahn | ............... | G05D 1/0044 |
| | | | | 134/56 R |
| 2018/0071908 A1* | 3/2018 | Goldenberg | ............... | G05D 1/0219 |
| 2019/0094870 A1* | 3/2019 | Afrouzi | ............... | G05D 1/0219 |
| 2020/0178748 A1* | 6/2020 | Han | ............... | A47L 11/4011 |

FOREIGN PATENT DOCUMENTS

| | | | |
|---|---|---|---|
| CN | 105302136 A | 2/2016 | |
| CN | 105739504 A | 7/2016 | |
| CN | 106564054 A | 4/2017 | |
| CN | 107063257 A | 8/2017 | |
| CN | 107121142 A | 9/2017 | |
| EP | 3066966 A1 * | 9/2016 | ............. A47L 9/009 |
| EP | 3081132 A1 * | 10/2016 | ............. A47L 9/009 |
| KR | 1020070045474 A | 5/2007 | |
| KR | 100730311 B1 | 6/2007 | |

OTHER PUBLICATIONS

China Office Action, Application No. 201711215140.0, dated Aug. 28, 2019, 7 pages.
International Search Report, Application No. PCT/CN2018/073737, dated Aug. 8, 2018, 4 pages (English Translation included).
Written Opinion of the International Searching Authority, Application No. PCT/CN2018/073737, dated Aug. 8, 2018, 5 pages. (English Translation included).
Zhang et al. "A topological Area Coverage Algorithm for Indoor Vacuuming Robot" Proceedings of the IEEE International Conference on Automation and Logistics, Aug. 18-21, 2007, Jinan, China, 5 pages.

* cited by examiner

COMMUNICATION RELATIONSHIP ESTABLISHING METHOD AND DEVICE, COMPUTER READABLE STORAGE MEDIUM, ELECTRONIC DEVICE AND CLEANING DEVICE

CROSS-REFERENCE TO RELATED APPLICATION

The present disclosure claims the priority to the Chinese patent application with the filing number 201711215140.0 filed on Nov. 28, 2017 with the Chinese Patent Office, and entitled "Communication Relationship Establishing Method and Device", which is incorporated herein by reference in entirety.

TECHNICAL FIELD

The present disclosure relates to the technical field of smart household, particularly to a communication relationship establishing method (i.e., a method for establishing a communication relationship), a communication relationship establishing device (i.e., a device for establishing a communication relationship), a computer readable storage medium, an electronic device and a cleaning device.

BACKGROUND ART

With continuous development of science and technology and further improvement on people's living standard, cleaning devices (e.g. cleaning robot) are becoming increasingly popular in people's life. The cleaning robot, also called as automatic cleaner, intelligent dust collector, robot dust collector and so on, is one kind of intelligent household appliances, which can automatically complete the floor cleaning operation in a room depending upon certain artificial intelligence. The cleaning robot generally adopts a brushing and vacuum mode, to first suck sundries on the floor into its own garbage storage box, so as to complete the function of floor cleaning.

The cleaning sequence of the existing cleaning robots are often out of order, so that the cleaning route of the cleaning robots usually cannot be optimal, and thus redundant cleaning is performed.

SUMMARY

In view of this, an object of embodiments of the present disclosure is to provide a communication relationship establishing method, a communication relationship establishing device, a computer readable storage medium, an electronic device and a cleaning device.

In order to achieve the above object, the embodiments of the present disclosure adopt the following technical solution:

In a first aspect, an embodiment of the present disclosure provides a communication relationship establishing method, wherein the method includes: dividing a to-be-cleaned region into at least two to-be-cleaned subregions; classifying, according to area, the at least two to-be-cleaned subregions into at least one large to-be-cleaned subregion and at least one small to-be-cleaned subregion; acquiring a boundary line between the large to-be-cleaned subregion and the small to-be-cleaned subregion; extending the boundary line, and determining whether the extended boundary line is capable of dividing the large to-be-cleaned subregion, wherein if yes, a first to-be-cleaned subregion located at a side of the boundary line same as the small to-be-cleaned subregion and a second to-be-cleaned subregion located at a side of the boundary line different from the small to-be-cleaned subregion are acquired; and establishing a communication relationship between the small to-be-cleaned subregion and the first to-be-cleaned subregion, and establishing a communication relationship between the small to-be-cleaned subregion and the second to-be-cleaned subregion.

In one possible design, the method further includes: determining, if cleaning of a current region is completed, whether there is an uncleaned region among regions communicated with the current region; if yes, determining whether the current region is a small to-be-cleaned subregion; and if yes, selecting, from uncleaned regions communicated with the current region, a region with a smallest area to clean.

In one possible design, after determining whether the current region is a small to-be-cleaned subregion, the method further includes: selecting, if the current region is not the small to-be-cleaned subregion, a region closest to a current position to clean from the uncleaned regions communicated with the current region.

In one possible design, the dividing a to-be-cleaned region into at least two to-be-cleaned subregions includes: establishing a mapping relationship between the to-be-cleaned region and a grid map; acquiring a certain uncleaned grid in the to-be-cleaned region, as a seed point, and taking a region where the seed point is located as a first to-be-cleaned subregion; acquiring a column where the seed point is located, and determining whether there is an uncleaned grid corresponding to the grid map in the column, and if yes, adding the grid to the first to-be-cleaned subregion; acquiring an adjacent column of the current column, and determining whether there is an uncleaned grid corresponding to the grid map in the adjacent column, and if yes, adding the grid to the first to-be-cleaned subregion; and repeating the step of "acquiring an adjacent column of the current column, and determining whether there is an uncleaned grid corresponding to the grid map in the adjacent column, and if yes, adding the grid to the first to-be-cleaned subregion", until there is no uncleaned grid, so as to complete establishment of the first to-be-cleaned subregion.

In one possible design, after determining whether there is an uncleaned region among regions communicated with the current region, the method further includes: returning to a previous region of the current region if there is no uncleaned region among the regions communicated with the current region, and taking the previous region as a new current region.

In one possible design, the method further includes: acquiring, as for each of the to-be-cleaned subregions in the to-be-cleaned region, a point of an upper edge and a point of a lower edge of the to-be-cleaned subregion, as coverage counter points; ordering, before cleaning the to-be-cleaned region, the coverage counter points of each of the to-be-cleaned subregions according to the communication relationships among various to-be-cleaned subregions in the to-be-cleaned region; and cleaning each to-be-cleaned subregion in the to-be-cleaned region according to the ordering.

In a second aspect, an embodiment of the present disclosure further provides a communication relationship establishing method, wherein the method further includes: dividing a to-be-cleaned region into at least two to-be-cleaned subregions; classifying, according to area, the at least two to-be-cleaned subregions into at least one large to-be-cleaned subregion and at least one small to-be-cleaned subregion; acquiring, as for each small to-be-cleaned subregion, a boundary line of the small to-be-cleaned subregion, and determining whether one side of the boundary line, which is opposite to the small to-be-cleaned subregion, is a large to-be-cleaned subregion; extending the boundary line if one side of the boundary line, which is opposite to the small to-be-cleaned subregion, is a large to-be-cleaned subregion, and determining whether the extended boundary line is capable of dividing the large to-be-cleaned subregion into at least two regions; and establishing communication relationships between at least two regions and the small to-be-cleaned subregion, respectively, if the extended boundary line is capable of dividing the large to-be-cleaned subregion into the at least two regions, and marking the at least two regions as large to-be-cleaned subregions, respectively.

In one possible design, the dividing a to-be-cleaned region into at least two to-be-cleaned subregions includes: mapping the to-be-cleaned region to a grid map; acquiring any uncleaned grid in the to-be-cleaned region, taking the grid as a seed point, and establishing a to-be-cleaned subregion including the seed point; acquiring, in the grid map, a column where the seed point is located as a current column, and determining whether there is an uncleaned grid in the current column; adding, if there is an uncleaned grid in the current column, the grid to the to-be-cleaned subregion; acquiring, in the grid map, an adjacent column of the current column as a new current column, and re-executing the determining whether there is an uncleaned grid in the current column; and completing establishment of the to-be-cleaned subregion if there is no uncleaned grid in the current column.

In one possible design, before the acquiring any uncleaned grid in the to-be-cleaned region, taking the grid as a seed point, the dividing a to-be-cleaned region into at least two to-be-cleaned subregions further includes: determining whether there is an uncleaned grid in the to-be-cleaned region; executing, if there is an uncleaned grid in the to-be-cleaned region, the step of acquiring any uncleaned grid in the to-be-cleaned region, taking the grid as a seed point; and stopping, if there is no uncleaned grid in the to-be-cleaned region, executing the step of dividing a to-be-cleaned region into at least two to-be-cleaned subregions.

In one possible design, after completing establishment of the to-be-cleaned subregion, the method further includes: re-executing the step of determining whether there is an uncleaned grid in the to-be-cleaned region.

In one possible design, the method further includes: acquiring, as for each of the to-be-cleaned subregions in the to-be-cleaned region, a point of an upper edge and a point of a lower edge of the to-be-cleaned subregion as coverage counter points; ordering, before cleaning the to-be-cleaned region, the coverage counter points of each of the to-be-cleaned subregions according to the communication relationships among various to-be-cleaned subregions in the to-be-cleaned region; and cleaning each to-be-cleaned subregion in the to-be-cleaned region according to the ordering.

In one possible design, the method further includes: cleaning each to-be-cleaned subregion in the to-be-cleaned region, and when completing the cleaning for the current to-be-cleaned subregion, determining whether there is an uncleaned region among regions communicated with the current to-be-cleaned subregion; determining, if there is an uncleaned region among regions communicated with the current to-be-cleaned subregion, whether the current to-be-cleaned subregion is a small to-be-cleaned subregion; and selecting, if the current to-be-cleaned subregion is a small to-be-cleaned subregion, a region with a smallest area to clean from various regions communicated with the current to-be-cleaned subregion.

In one possible design, the method further includes: selecting, if the current to-be-cleaned subregion is not a small to-be-cleaned subregion, a region closest to a current position to clean from various regions communicated with the current to-be-cleaned subregion.

In a third aspect, an embodiment of the present disclosure further provides a communication relationship establishing device, wherein the device includes: a primary subregion dividing module, configured to divide a to-be-cleaned region into at least two to-be-cleaned subregions; an area distinguishing module, configured to classify, according to area, the at least two to-be-cleaned subregions into a large to-be-cleaned subregion and a small to-be-cleaned subregion; a boundary line acquiring module, configured to acquire a boundary line between the large to-be-cleaned subregion and the small to-be-cleaned subregion; a boundary line dividing module, configured to extend the boundary line, and determine whether the extended boundary line is capable of dividing the large to-be-cleaned subregion; a subregion redividing module, configured to acquire a first to-be-cleaned subregion located at the same side of the boundary line as the small to-be-cleaned subregion and a second to-be-cleaned subregion located at a different side of the boundary line from the small to-be-cleaned subregion; and a communication relationship establishing module, configured to establish a communication relationship between the small to-be-cleaned subregion and the first to-be-cleaned subregion, and establish a communication relationship between the small to-be-cleaned subregion and the second to-be-cleaned subregion.

In one possible design, the device further includes: an uncleaned region determining module, configured to determine whether there is an uncleaned region among regions communicated with the current region; a small subregion determining module, configured to determine whether the current region is a small to-be-cleaned subregion; and an area selecting module, configured to select, from the uncleaned regions communicated with the current region, a region with a smallest area to clean.

In one possible design, the device further includes: a distance selecting module, configured to select, from the uncleaned regions communicated with the current region, a region closest to a current position to clean.

In one possible design, the primary subregion dividing module includes: a mapping relationship establishing submodule, configured to establish a mapping relationship between the to-be-cleaned region and a grid map; a seed point acquiring submodule, configured to acquire a certain uncleaned grid in the to-be-cleaned region, as a seed point, and taking a region where the seed point is located as a first to-be-cleaned subregion; an uncleaned grid submodule, configured to acquire a column where the seed point is located, and determine whether there is an uncleaned grid corresponding to the grid map in the column, wherein if yes, the grid is added to the first to-be-cleaned subregion; an adjacent column determining submodule, configured to acquire an adjacent column of the current column, and determine whether there is an uncleaned grid corresponding to the grid map in the adjacent column, wherein if yes, the grid is added to the first to-be-cleaned subregion; and a region establishment completing submodule, configured to repeat the step of "acquiring an adjacent column of the current column, and determining whether there is an uncleaned grid corresponding to the grid map in the adjacent column, and if yes, adding the grid to the first to-be-cleaned subregion", until there is no uncleaned grid, then completing the establishment of the first to-be-cleaned subregion.

In one possible design, the device further includes: a region returning module, configured to return to a previous region of the current region if there is no uncleaned region among the regions communicated with the current region, and take the previous region as a new current region.

In a fourth aspect, an embodiment of the present disclosure provides a computer readable storage medium, configured to store a computer instruction, wherein the computer instruction includes a corresponding program configured to execute the communication relationship establishing method provided in the first aspect of the embodiment of the present disclosure.

In a fifth aspect, an embodiment of the present disclosure provides an electronic device, including a processor and a computer readable storage medium, wherein the computer readable storage medium is configured to store a computer instruction, and a program corresponding to the communication relationship establishing method provided in the first aspect of the embodiment of the present disclosure is executed when the computer instruction is read by the processor and is running.

In a sixth aspect, an embodiment of the present disclosure provides a cleaning device, including a processor and a computer readable storage medium, wherein the computer readable medium is stored with a non-volatile program code executable by the processor, and the program code enables the processor to execute the communication relationship establishing method provided in the second aspect of the embodiment of the present disclosure.

In the communication relationship establishing method, the communication relationship establishing device, the computer readable storage medium, the electronic device and the cleaning device provided in the embodiments of the present disclosure, first, the to-be-cleaned region can be divided into at least two to-be-cleaned subregions, then the large to-be-cleaned subregion and the small to-be-cleaned subregion are classified according to the area, the boundary line between the two is acquired, the boundary line is extended, and it is determined whether the extended boundary line can divide the above large to-be-cleaned subregion, and if yes, the large to-be-cleaned subregion is divided into the first to-be-cleaned subregion located at the same side of the boundary line as the small to-be-cleaned subregion and the second to-be-cleaned subregion located at the different side of the boundary line from the small to-be-cleaned subregion, and the communication relationship between the small to-be-cleaned subregion and the first to-be-cleaned subregion and the communication relationship between the small to-be-cleaned subregion and the second to-be-cleaned subregion are established, respectively. Compared with the prior art, in the embodiments of the present disclosure, the to-be-cleaned region can be divided by the boundary line, and after the division, the communication relationship between the to-be-cleaned subregion obtained by the division and the original small to-be-cleaned subregion can be established, so as to provide a basis for establishing the cleaning sequence of the cleaning device, thus solving the problem that the cleaning sequence of the existing cleaning devices is out of order, which easily causes redundant cleaning.

BRIEF DESCRIPTION OF DRAWINGS

In order to more clearly illustrate technical solutions in the embodiments of the present disclosure or the prior art, drawings which need to be used for description of the embodiments or the prior art will be introduced briefly below, and apparently, the drawings in the description below merely show some embodiments of the present disclosure, and those ordinarily skilled in the art still could obtain other drawings in light of these drawings, without using any creative effort.

DETAILED DESCRIPTION OF EMBODIMENTS

Figure 1:
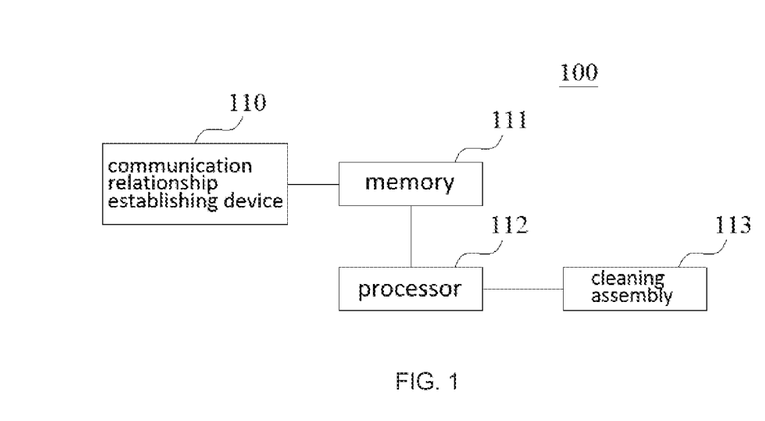
FIG. 1 is a block diagram of a cleaning device provided in an embodiment of the present disclosure.

Please referring to FIG. 1, it is a block diagram of a cleaning device 100 provided in an embodiment of the present disclosure. The cleaning device 100 may be an electronic device having a cleaning function, for example, a cleaning robot. The cleaning device 100 includes a communication relationship establishing device 110, a memory 111, a processor 112 and a cleaning assembly 113.

The memory 111, the processor 112 and the cleaning assembly 113 are directly or indirectly electrically connected with each other, so as to realize transmission or interaction of data. For example, these elements can realize the electrical connection via one or more communication buses or signal lines. The communication relationship establishing device 110 includes at least one software functional module that can be stored in the memory 111 in a form of software or firmware, or solidified in an operating system (OS) of the cleaning device 100. The processor 112 is configured to execute an executable module (for example, a module corresponding to the communication relationship establishing method provided in the present embodiment) stored in the memory 111, so as to control the cleaning assembly 113 to clean.

In the above, the memory 111 may be, but not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM) and so on.

The processor 112 may be an integrated circuit chip, with a function of processing signals. The processor 112 may be a general-purpose processor, for example, Central Processing Unit (CPU), and Network Processor (NP), and also may be a digital signal processor (DSP), an application-specific integrated circuit (ASIC), a Field-Programmable Gate Array (FPGA) or other programmable logic devices, discrete gates, transistor logic devices, or discrete hardware components. The processor 112 can realize or implement various methods, steps and logic block diagrams disclosed in the embodiments of the present disclosure. The above general-purpose processor may be a microprocessor or any other conventional processor.

The cleaning assembly 113 may be an assembly, for example, a broom, installed to the cleaning device 100 and configured to perform cleaning. The cleaning assembly 113 is configured to clean a to-be-cleaned region under the control of the processor 112.

It should be understood that the structure shown in FIG. 1 is merely exemplary, while the cleaning device 100 further may include more or less assemblies than those shown in FIG. 1, or is configured in a way totally different from that shown in FIG. 1. Various assemblies shown in FIG. 1 can be realized by means of software, hardware or a combination thereof.

Before cleaning the to-be-cleaned region, the existing cleaning devices will divide the to-be-cleaned region, and then clean various subregions divided according to a specific order. Through a lot of researches, the inventors found that the cleaning sequence is out of order when the existing cleaning devices clean various subregions of the to-be-cleaned region, and there easily appears the situation that a certain region is cleaned repeatedly, or that a certain region is left out.

In order to solve at least one of the above problems, embodiments of the present disclosure provide a communication relationship establishing method and a communication relationship establishing device, wherein the to-be-cleaned region is divided, and a communication relationship between the to-be-cleaned subregions obtained from the division is established, so as to provide a basis for subsequent establishment of the cleaning sequence, that is, the cleaning sequence of various to-be-cleaned subregions can be further determined according to the communication relationship.

First Embodiment

Figure 2:
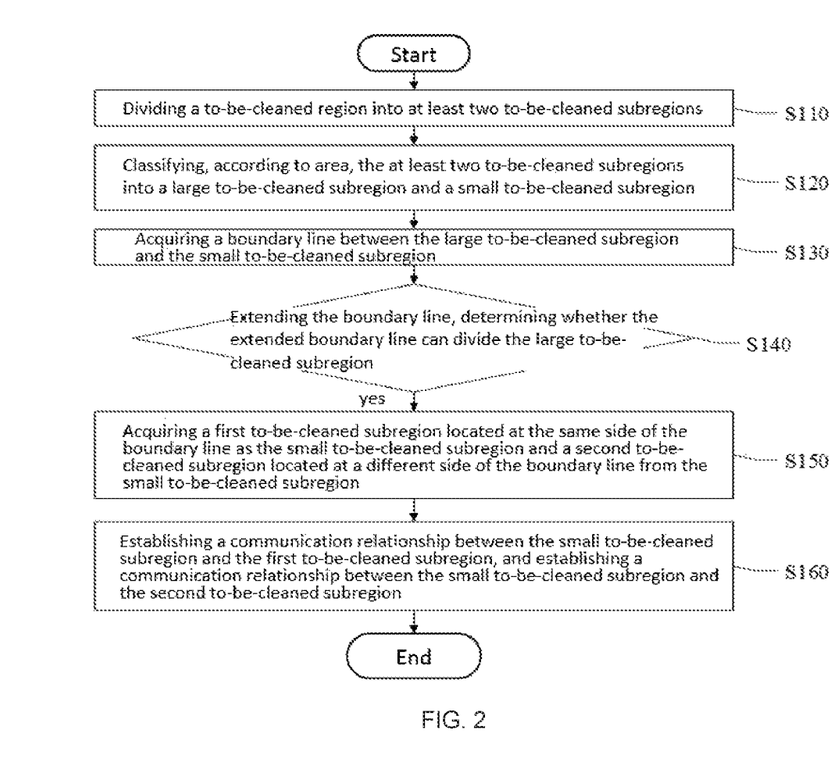
FIG. 2 is a schematic flowchart of a communication relationship establishing method provided in a first embodiment of the present disclosure.

Please referring to FIG. 2, FIG. 2 shows a flowchart of a communication relationship establishing method provided in a first embodiment of the present disclosure, wherein this method can be applied to the cleaning device shown in FIG. 1, and this method includes following steps:

Step S110, dividing a to-be-cleaned region into at least two to-be-cleaned subregions.

Figure 6:
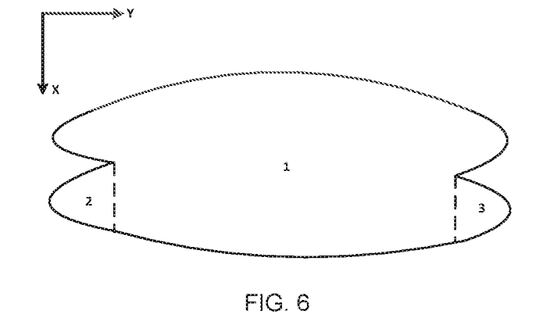
FIG. 6 is a schematic view of an application scenario of dividing a to-be-cleaned region for a first time.

In a specific embodiment, the to-be-cleaned region can be divided into the to-be-cleaned subregions with numbers 1, 2, and 3 as shown in FIG. 6. The region division is performed after the cleaning device has performed edge cleaning for the whole to-be-cleaned region. The step of dividing the to-be-cleaned region can be performed in a processor 112 of the cleaning device 100, and also can be uploaded by the cleaning device 100 to a server connected, so as to be performed in the server.

Figure 3:
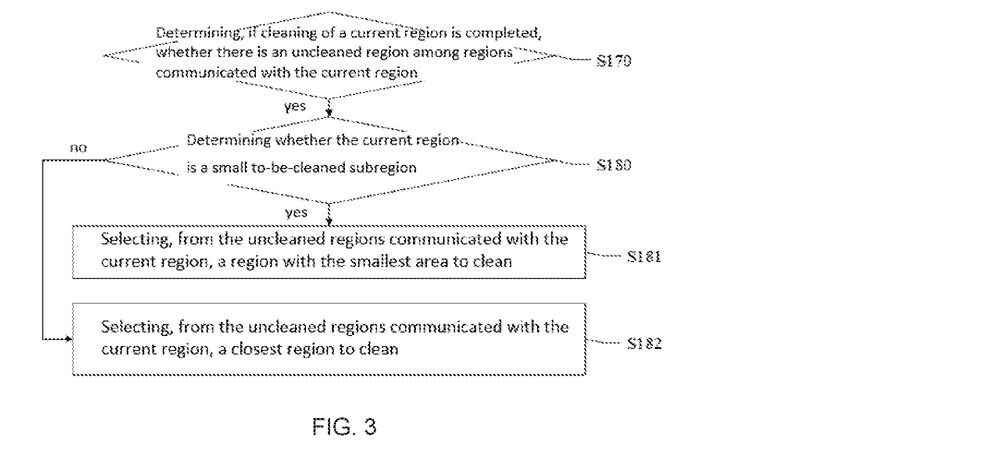
FIG. 3 is another schematic flowchart of the communication relationship establishing method provided in the first embodiment of the present disclosure.
Figure 4:
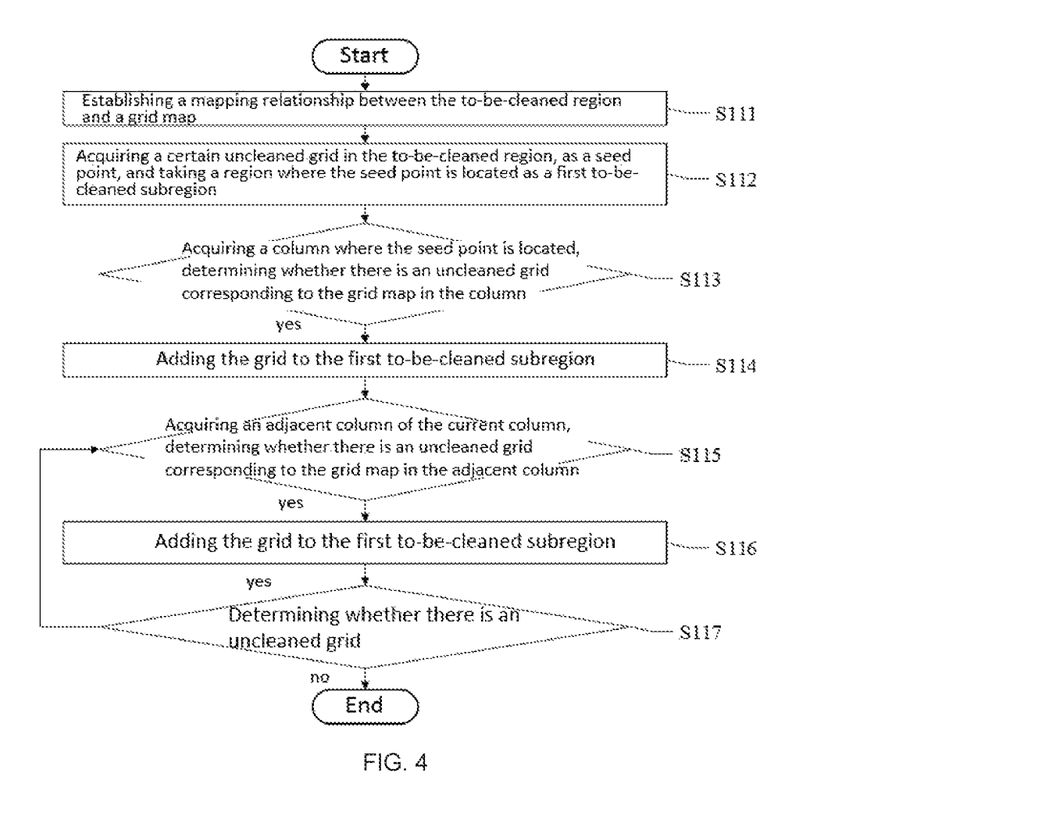
FIG. 4 is a schematic view of specific steps of step S110 in FIG. 2.

Please referring to FIG. 3, the step S110 may include following steps:

Step S111, establishing a mapping relationship between the to-be-cleaned region and a grid map.

The to-be-cleaned region as shown in FIG. 6 can be overlapped with the grid map, wherein the grid map refers to a checkerboard rectangular shape composed of a plurality of squares of equal size. When the to-be-cleaned region is overlapped with the grid map, the plurality of squares in the grid map can divide the to-be-cleaned region into a plurality of square regions of the same size as the squares.

Step S112, acquiring a certain uncleaned grid in the to-be-cleaned region, as a seed point, and taking a region where the seed point is located as a first to-be-cleaned subregion.

In the to-be-cleaned region, one grid that has not been cleaned by the cleaning robot is randomly selected, that is, one non-edge position within the to-be-cleaned region is selected as the seed point, and the region where the seed point is located can be taken as the first to-be-cleaned subregion. That is, one first to-be-cleaned subregion including the seed point is established, and when the first to-be-cleaned subregion is established, the first to-be-cleaned subregion may merely include the seed point.

At this time, the whole to-be-cleaned region needs to undergo region division, then one seed point can be first randomly selected from the to-be-cleaned region, so as to distinguish the first to-be-cleaned subregion where the seed point is located and the to-be-cleaned subregions where the seed point is not located.

Step S113, acquiring a column where the seed point is located, judging whether there is an uncleaned grid corresponding to the grid map in the column, and if yes, executing step S114.

The column where the seed point is located is acquired according to the grid map, and it is determined whether there is a grid, in the column, that has not been cleaned by the cleaning robot when cleaning along edges, and if yes, the step S114 is executed.

Step S114, adding the grid to the first to-be-cleaned subregion.

All of the uncleaned grids in the column where the seed point is located are added to the first to-be-cleaned subregion where the seed point is located.

Step S115, acquiring an adjacent columns of the current column, and determining whether there is an uncleaned grid corresponding to the grid map in the adjacent columns, and if yes, executing step S116.

After completing classification of the column where the seed point is located, the adjacent columns of the column where the seed point is located can be acquired, wherein the adjacent columns include one left column and one right column of the column where the seed point is located, and likewise, it is determined whether there is a grid that has not been cleaned by the cleaning robot in the adjacent columns, and if yes, the step S116 is executed, and the execution can be started from the left column or the right column of the column where the seed point is located, and a specific direction should not be construed as limitation on the present disclosure.

Step S116, adding the grid to the first to-be-cleaned subregion.

After it is determined that there is a grid that has not been cleaned by the cleaning device 100 in the adjacent columns, a plurality of uncleaned grids in the adjacent column are acquired, and all of the plurality of grids are added to the first to-be-cleaned subregion.

Step S117, determining whether there is an uncleaned grid, and if yes, executing the step S115.

It is determined whether there is still an uncleaned grid left out in the first to-be-cleaned subregion, and if yes, go to the step S115 to acquire an adjacent column of a current column, wherein the current column herein may be an adjacent column of the column where the seed point is located. Thus, columns at two sides of the column where the seed point is located are traversed, so as to complete the establishment of the first to-be-cleaned subregion.

After completing the establishment of the first to-be-cleaned subregion, one seed point can be randomly selected from a region other than the first to-be-cleaned subregion, and the step S111 to the step S117 continue to be executed so as to complete division of the to-be-cleaned region, wherein reference can be made to FIG. 6 for a division effect drawing of the to-be-cleaned region obtained after the step S117 is ended, and 1, 2, and 3 in the figure represent three to-be-cleaned subregions divided, respectively.

Step S120, classifying, according to area, the at least two to-be-cleaned subregions into a large to-be-cleaned subregion and a small to-be-cleaned subregion.

The divided to-be-cleaned subregions are recorded in the memory 111 of the cleaning device 100, and the cleaning device 100 can classify them into a large to-be-cleaned subregion and a small to-be-cleaned subregion according to the area of each to-be-cleaned subregion, for example, taking FIG. 6 as an example, region 2 and region 3 in the figure are classified as small to-be-cleaned subregions, and region 1 in the figure is classified as a large to-be-cleaned subregion.

Step S130, acquiring a boundary line between the large to-be-cleaned subregion and the small to-be-cleaned subregion.

As in FIG. 6, a dotted line between the region represented by 1 and the region represented by 2, or a dotted line between the region represented by 1 and the region represented by 3 is a boundary line.

Step S140, extending the boundary line, determining whether the extended boundary line can divide the large to-be-cleaned subregion, and if yes, executing the step S150.

The boundary line is extended, and it is determined whether the extended boundary line can further divide the large to-be-cleaned subregion, and if yes, the step S150 is executed.

Step S150, acquiring a first to-be-cleaned subregion located at the same side of the boundary line as the small to-be-cleaned subregion and a second to-be-cleaned subregion located at a different side of the boundary line from the small to-be-cleaned subregion.

Figure 7:
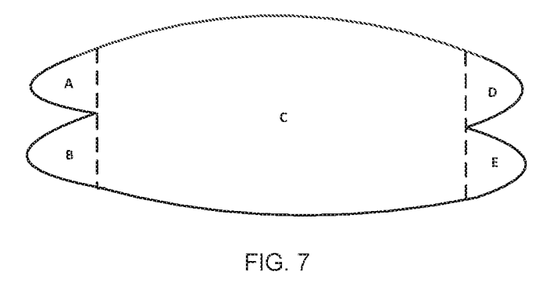
FIG. 7 is a schematic view of an application scenario of dividing the to-be-cleaned region for a second time.

Please referring to FIG. 7, FIG. 7 is an effect schematic view of the to-be-cleaned region obtained after the to-be-cleaned region is further divided by the boundary lines, wherein after the boundary line between the region where 2 is located in FIG. 6 (i.e. a region where B is located in FIG. 7) and the region where 1 is located in FIG. 6 is extended, the region where 1 is located in FIG. 6 is divided into a region where A is located in FIG. 7 and a region where C is located in FIG. 7; and after the boundary line between the region where 3 is located in FIG. 6 (i.e. a region where E is located in FIG. 7) and the region where 1 is located in FIG. 6 is extended, the region where 1 is located in FIG. 6 is divided into a region where D is located in FIG. 7 and the region where C is located in FIG. 7.

In the above, the region where A is located in FIG. 7 is the first to-be-cleaned subregion located at the same side of the boundary line as the region where B is located in FIG. 7, and the region where C is located in FIG. 7 is the second to-be-cleaned subregion located at the different side of the boundary line from the region where B is located in FIG. 7.

Similarly, the region where D is located in FIG. 7 is the first to-be-cleaned subregion located at the same side of the boundary line as the region where E is located in FIG. 7, and the region where C is located in FIG. 7 is the second to-be-cleaned subregion located at the different side of the boundary line from the region where E is located in FIG. 7.

Step S160, establishing a communication relationship between the small to-be-cleaned subregion and the first to-be-cleaned subregion, and establishing a communication relationship between the small to-be-cleaned subregion and the second to-be-cleaned subregion.

Establishing the communication relationship between the small to-be-cleaned subregion and the first to-be-cleaned subregion, and establishing the communication relationship between the small to-be-cleaned subregion and the second to-be-cleaned subregion are, in FIG. 7, establishing a communication relationship between the region where B is located and the region where A is located and a communication relationship between the region where B is located and the region where C is located.

After establishing the communication relationships among various to-be-cleaned subregions in the to-be-cleaned region, a cleaning sequence can be determined according to the communication relationships, and cleaning is carried out according to the cleaning sequence.

In a specific embodiment, it can be realized through the steps shown in FIG. 3, and is described in detail as follows: step S170, determining, if cleaning of a current region is completed, whether there is an uncleaned region among regions communicated with the current region, and if yes, executing step S180.

When the cleaning robot is located in the region where A is located, and when the cleaning robot has completed the cleaning operation for the region where A is located, it is determined whether there is an uncleaned region among the regions communicated with the region where A is located, and it can be seen from the step S110 to the step S160 that the region in a communicated state with the region where A is located is only the region where B is located, therefore, it can be determined whether the region where B is located is cleaned, and if the region where B is located is not cleaned, the step S180 is executed.

Optionally, if there is no uncleaned region among the regions communicated with the current region, the cleaning robot returns to a previous region of the current region, and takes the previous region as a new current region.

For example, as for the region where A is located, the region in a communicated state with the region where A is located is only the region where B is located, and if the region where B is located has been cleaned, there is no uncleaned region, at this time, the cleaning robot returns back to the previous region of the region where A is located, i.e., the region where B is located, and the region where B is located is taken as a new current region.

Step S180, determining whether the current region is a small to-be-cleaned subregion, if yes, executing step S181, and if no, executing step S182.

It can be determined whether the current region is a small to-be-cleaned subregion, and a corresponding cleaning strategy executed for the uncleaned region communicated with the current region is determined according to the type of the current region.

Step S181, selecting, from the uncleaned regions communicated with the current region, a region with the smallest area to clean.

For example, if the current region is a small to-be-cleaned subregion, the region with the smallest area is selected to clean from the uncleaned regions communicated with the current region. For the region where A is located, if the region where B is located is not cleaned, and B is an only region communicated with A, the cleaning robot selects the region where B is located to execute a cleaning action.

Step S182, selecting, from the uncleaned regions communicated with the current region, a closest region to clean.

If the current region is a large to-be-cleaned subregion, the closest region can be selected to clean from the uncleaned regions communicated with the current region.

In detail, please referring to FIG. 7, for the region where C is located, regions communicated with C include the region where B is located and the region where E is located, and if one of the two is cleaned, and the other is not cleaned, the cleaning robot goes to the uncleaned region to clean; and if neither is cleaned, the cleaning robot goes to the region closer to the current position to clean.

Please referring to FIG. 7, in a specific embodiment, if the cleaning robot is located in the region where B is located (hereinafter referred to as "region B" for short) at the very beginning, and none of the regions where A, C, D, and E are located (hereinafter referred to as "regions A, C, D, and E" for short) is cleaned, the cleaning robot executes a cleaning task according to a following flow:

First, a cleaning operation is completed for the region B, the region A and the region C communicated with the region B are acquired and it is determined whether the region A and the region C are cleaned, and as neither the region A nor the region C is cleaned and the region B belongs to a small to-be-cleaned subregion, the cleaning robot selects the region A with a smaller area from the region A and the region C to clean.

After completing the cleaning operation for the region A, the region B communicated with the region A is acquired, and it is determined whether the region B is cleaned, and as the region B has been cleaned, the cleaning robot returns back to the previous region of the region A, i.e. the region B, and takes the region B as a new current region.

At this time, as for the region B, the region A communicated with the region B has been cleaned, and the region C has not been cleaned, then the cleaning robot goes to the region C to execute the cleaning operation.

After the cleaning operation is completed for the region C, the region B and the region E communicated with the region C are acquired, and as the region B has been cleaned while the region E has not been cleaned, the cleaning robot goes to the region E to execute the cleaning operation.

After the cleaning operation is completed for the region E, the region C and the region D communicated with the region E are acquired, and as the region C has been cleaned while the region D has not been cleaned, the cleaning robot goes to the region D to execute the cleaning operation.

So far, the cleaning robot completes the cleaning operation for all of the regions including the regions A, B, C, D, and E.

Figure 8:
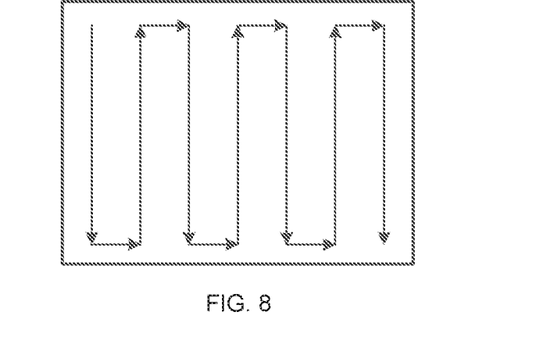
FIG. 8 is a schematic view of a direction for cleaning the to-be-cleaned region by the cleaning device.

In another specific embodiment, when executing the cleaning operation, the cleaning device 100 can operate in a zigzag manner shown in FIG. 8. Specifically, it may be realized through following steps:

First, as for each to-be-cleaned subregion in the to-be-cleaned region, a point of an upper edge and a point of a lower edge of the to-be-cleaned subregion are acquired as coverage counter points.

Optionally, when executing the step S113 and the step S114, grids in each column should be traversed, and the first step above can be executed at this time. In other words, when establishment of one to-be-cleaned subregion is completed, coverage counter points therein are also generated.

Second, before cleaning the to-be-cleaned region, the coverage counter points of each to-be-cleaned subregion are ordered according to the communication relationships among various to-be-cleaned subregions in the to-be-cleaned region.

Taking the five to-be-cleaned subregions A, B, C, D, and E shown in FIG. 7 as an example, the communication relationships therebetween are (A, B), (B, C), (C, D), and (D, E), wherein two regions within the same bracket are to-be-cleaned subregions communicated with each other. On this basis, the coverage counter points of the five to-be-cleaned subregions A, B, C, D, and E can be arranged in a following order: A→B→C→D→E, thus, the zigzag cleaning can be realized.

In the communication relationship establishing method provided in the first embodiment of the present disclosure, the whole to-be-cleaned region is divided, and the communication relationships between various subregions are established according to the dividing process, such that the cleaning device 100 can execute the cleaning task according to the communication relationships between the various subregions, then compared with the prior art, the subregion is divided more scientifically, and a relatively comprehensive cleaning solution can be achieved with a shorter distance.

Figure 5:
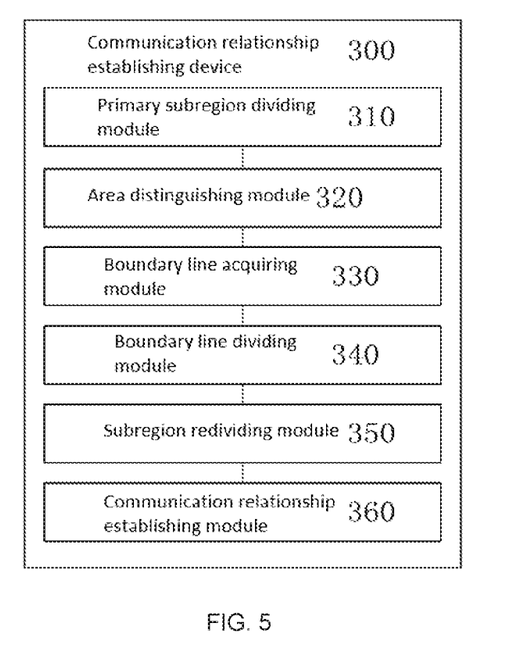
FIG. 5 is a structural block diagram of a communication relationship establishing device provided in the first embodiment of the present disclosure.

Please referring to FIG. 5, FIG. 5 is a structural schematic view of a communication relationship establishing device provided in an embodiment of the present disclosure, wherein the device 300 includes: a primary subregion dividing module 310, an area distinguishing module 320, a boundary line acquiring module 330, a boundary line dividing module 340, a subregion redividing module 350, and a communication relationship establishing module 360.

The primary subregion dividing module 310 is configured to divide a to-be-cleaned region into at least two to-be-cleaned subregions.

Optionally, the primary subregion dividing module 310 may include a mapping relationship establishing submodule, a seed point acquiring submodule, an uncleaned grid submodule, an adjacent column determining submodule and a region establishment completing submodule.

In the above, the mapping relationship establishing submodule is configured to establish a mapping relationship between the to-be-cleaned region and a grid map.

The seed point acquiring submodule is configured to acquire a certain uncleaned grid in the to-be-cleaned region, as a seed point, and take a region where the seed point is located as a first to-be-cleaned subregion.

The uncleaned grid submodule is configured to acquire a column where the seed point is located, and determine whether there is an uncleaned grid corresponding to the grid map in the column, and if yes, the grid is added to the first to-be-cleaned subregion.

The adjacent column determining submodule is configured to acquire an adjacent column of the current column, and determine whether there is an uncleaned grid corresponding to the grid map in the adjacent column, and if yes, the grid is added to the first to-be-cleaned subregion.

The region establishment completing submodule is configured to repeat the step of "acquiring an adjacent column of the current column, and determining whether there is an uncleaned grid corresponding to the grid map in the adjacent column, and if yes, adding the grid to the first to-be-cleaned subregion", until there is no uncleaned grid, then the establishment of the first to-be-cleaned subregion is completed.

The area distinguishing module 320 is configured to classify, according to area, the at least two to-be-cleaned subregions into a large to-be-cleaned subregion and a small to-be-cleaned subregion.

The boundary line acquiring module 330 is configured to acquire a boundary line between the large to-be-cleaned subregion and the small to-be-cleaned subregion.

The boundary line dividing module 340 is configured to extend the boundary line, and determine whether the extended boundary line can divide the large to-be-cleaned subregion.

The subregion redividing module 350 is configured to acquire a first to-be-cleaned subregion located at the same side of the boundary line as the small to-be-cleaned subregion and a second to-be-cleaned subregion located at a different side of the boundary line from the small to-be-cleaned subregion.

The communication relationship establishing module 360 is configured to establish a communication relationship between the small to-be-cleaned subregion and the first to-be-cleaned subregion, and establish a communication relationship between the small to-be-cleaned subregion and the second to-be-cleaned subregion.

The device may further include: an uncleaned region determining module, a small subregion determining module, an area selecting module, a distance selecting module and a region returning module.

In the above, the uncleaned region determining module is configured to determine whether there is an uncleaned region among regions communicated with the current region.

The small subregion determining module is configured to determine whether the current region is a small to-be-cleaned subregion.

The area selecting module is configured to select, from the uncleaned regions communicated with the current region, a region with the smallest area to clean.

The distance selecting module is configured to select, from the uncleaned regions communicated with the current region, a closest region to clean.

The region returning module is configured to return to a previous region of the current region if there is no uncleaned region among the regions communicated with the current region, and take the previous region as a new current region.

A person skilled in the art could clearly know that for the sake of convenience and conciseness of description, reference can be made to corresponding process in the preceding method for specific operation process of the device described above, and no redundant description will be given herein.

The present embodiment further provides a computer readable storage medium, in which a computer instruction is stored, and the communication relationship establishing method provided in the present embodiment is executed when the computer instruction is executed.

The present embodiment further provides an electronic device, including a processor and the above computer readable storage medium.

Second Embodiment

Figure 9:
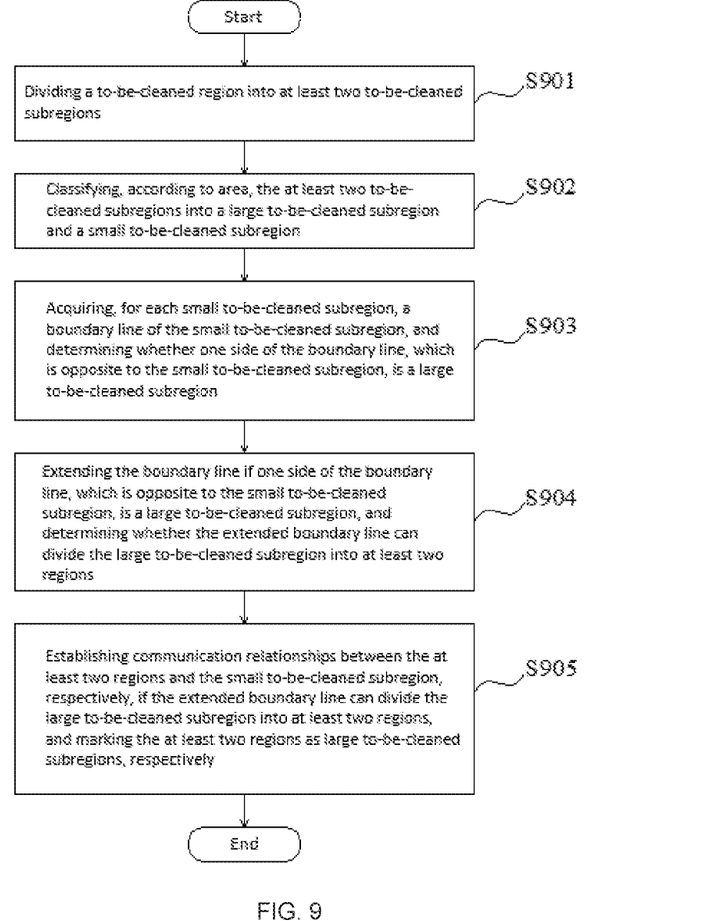
FIG. 9 is a schematic flowchart of a communication relationship establishing method provided in a second embodiment of the present disclosure.

The present embodiment provides a communication relationship establishing method applied to the cleaning device 100 shown in FIG. 1, and as shown in FIG. 9, the method includes following steps:

Step S901, dividing a to-be-cleaned region into at least two to-be-cleaned subregions.

Figure 10:
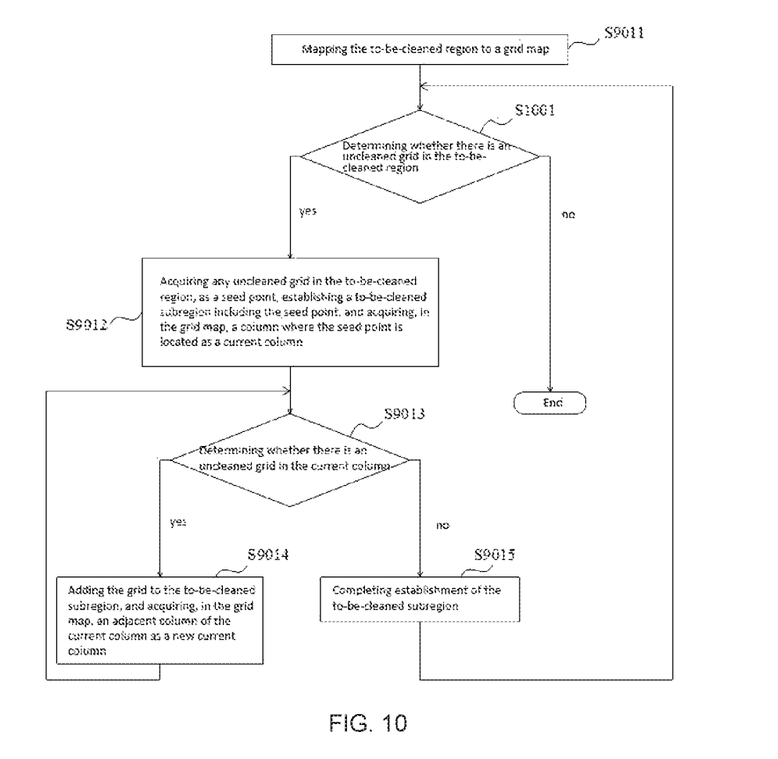
FIG. 10 is a schematic view of substeps of step S901 shown in FIG. 9.

Optionally, as shown in FIG. 10, the step S901 may include following substeps:

Step S9011, mapping the to-be-cleaned region to a grid map.

Step S9012, acquiring any uncleaned grid in the to-be-cleaned region, taking the grid as a seed point, establishing a to-be-cleaned subregion including the seed point, and acquiring, in the grid map, a column where the seed point is located as a current column.

Step S9013, determining whether there is an uncleaned grid in the current column. If yes, step S9014 is executed, and if no, step S9015 is executed.

Step S9014, adding the grid to the to-be-cleaned subregion, acquiring, in the grid map, an adjacent column of the current column as a new current column, and re-executing the step S9013.

Step S9015, completing establishment of the to-be-cleaned subregion.

Optionally, prior to executing the step S9012, the step S901 further may include:

Step S1001, determining whether there is an uncleaned grid in the to-be-cleaned region, and if yes, executing the step S9012, and if no, executing step S1002.

Step S1002, stopping executing the step of dividing a to-be-cleaned region into at least two to-be-cleaned subregions.

Optionally, after executing the step S9015, the method further includes: re-executing the step S1001.

Step S902, classifying, according to area, the at least two to-be-cleaned subregions into a large to-be-cleaned subregion and a small to-be-cleaned subregion.

Step S903, acquiring, as for each small to-be-cleaned subregion, a boundary line of the small to-be-cleaned subregion, and determining whether one side of the boundary line, which is opposite to the small to-be-cleaned subregion, is a large to-be-cleaned subregion.

Step S904, extending the boundary line if one side of the boundary line, which is opposite to the small to-be-cleaned subregion, is a large to-be-cleaned subregion, and determining whether the extended boundary line can divide the large to-be-cleaned subregion into at least two regions.

Step S905, establishing communication relationships between the at least two regions and the small to-be-cleaned subregion, respectively, if the extended boundary line can divide the large to-be-cleaned subregion into at least two regions, and marking the at least two regions as large to-be-cleaned subregions, respectively.

Optionally, in an embodiment, in the communication relationship establishing method, the to-be-cleaned region can be cleaned through following steps:

acquiring, as for each to-be-cleaned subregion in the to-be-cleaned region, a point of an upper edge and a point of a lower edge of the to-be-cleaned subregion as coverage counter points;

ordering, before cleaning the to-be-cleaned region, the coverage counter points of each to-be-cleaned subregion according to the communication relationships among various to-be-cleaned subregions in the to-be-cleaned region; and cleaning each to-be-cleaned subregion in the to-be-cleaned region according to the ordering.

In another embodiment, in the communication relationship establishing method, the to-be-cleaned region can be cleaned through following steps:

cleaning each to-be-cleaned subregion in the to-be-cleaned region, and when completing the cleaning for the current to-be-cleaned subregion, determining whether there is an uncleaned region among regions communicated with the current to-be-cleaned subregion;

determining, if there is an uncleaned region among regions communicated with the current to-be-cleaned subregion, whether the current to-be-cleaned subregion is a small to-be-cleaned subregion, and if the current to-be-cleaned subregion is a small to-be-cleaned subregion, selecting a region with the smallest area to clean from various regions communicated with the current to-be-cleaned subregion; and selecting, if the current to-be-cleaned subregion is not a small to-be-cleaned subregion, a region closest to a current position to clean from various regions communicated with the current to-be-cleaned subregion.

In the communication relationship establishing method and the communication relationship establishing device provided in the embodiments of the present disclosure, first, the to-be-cleaned region can be divided into at least two to-be-cleaned subregions, then the large to-be-cleaned subregion and the small to-be-cleaned subregion are classified according to the area, the boundary line between the two is acquired, the boundary line is extended, and it is determined whether the extended boundary line can divide the above large to-be-cleaned subregion, and if yes, the large to-be-cleaned subregion is divided into the first to-be-cleaned subregion located at the same side of the boundary line as the small to-be-cleaned subregion and the second to-be-cleaned subregion located at the different side of the boundary line from the small to-be-cleaned subregion, and the communication relationship between the small to-be-cleaned subregion and the first to-be-cleaned subregion, and the communication relationship between the small to-be-cleaned subregion and the second to-be-cleaned subregion are established, respectively. Compared with the prior art, in the embodiments of the present disclosure, the to-be-cleaned region can be divided by the boundary line, and after the division, the communication relationship between the to-be-cleaned subregion obtained by the division and the original small to-be-cleaned subregion can be established, and the cleaning sequence is arranged according to the communication relationship between the two, thus solving the problem that the cleaning sequence of the existing cleaning robots is out of order, which easily causes redundant cleaning.

It should be noted that various embodiments in the present description are described in a progressive manner, each embodiment focuses on the differences from other embodiments, and the same or similar parts between various embodiments may refer to each other. For device embodiment, since it is substantially similar to the method embodiment, it is described relatively simply, and reference can be made to the description in parts of the method embodiment for related parts.

In the several embodiments provided in the present disclosure, it should be understood that the device and the method disclosed also may be implemented in other manners. The device embodiments described above are merely illustrative, for example, the flowcharts and the block diagrams in the drawings show possible system structures, functions, and operations of the device, method, and computer program products according to multiple embodiments of the present disclosure. In this regard, each block in the flowchart or the block diagram may represent a part of one module, program segment, or code, and the part of the module, the program segment, or the code contains one or more executable instructions configured to achieve a specified logical function. It also should be noted that in some implementations as substitution, the functions indicated in the blocks also may be proceeded in an order different from that indicated in the drawings. For example, two continuous blocks practically can be executed substantially in parallel, and they sometimes also may be executed in a reverse order, which depends upon a function involved. It also should be noted that each block in the block diagram and/or flowchart, and combinations of the blocks in the block diagram and/or the flowchart can be realized by a dedicated hardware-based system configured to execute a specified function or action, or can be realized by a combination of dedicated hardware and computer instructions.

Besides, the various functional modules in various embodiments of the present disclosure can be integrated together to form one independent portion, and it is also possible that the various modules exist independently, or that two or more modules are integrated to form one independent part.

If the function is realized in a form of software functional module and is sold or used as an individual product, it may be stored in one computer readable storage medium. Based on such understanding, the technical solutions in essence or parts making contribution to the prior art or parts of the technical solutions of the present disclosure can be embodied in form of a software product, and this computer software product is stored in a storage medium, including several instructions for making one computer device (which can be a personal computer, a server or a network device, etc.) execute all or part of the steps of the methods of various embodiments of the present disclosure. The aforementioned storage medium includes various media in which program codes can be stored, such as U disk, mobile hard disk, Read-Only Memory (ROM), Random Access Memory (RAM), diskette and compact disk. It should be indicated that in the present text, relational terms such as first and second are merely for distinguishing one entity or operation from another entity or operation, while it is not required or implied that these entities or operations necessarily have any such practical relation or order. Moreover, terms "including", "containing" or any other derivatives thereof are intended to be non-exclusive, thus a process, method, article or device including a series of elements not only include those elements, but also include other elements that are not listed definitely, or further include elements inherent to such process, method, article or device. Without more restrictions, an element defined with wording "including a . . . " does not exclude presence of other same elements in the process, method, article or device including said element.

The above-mentioned are merely for preferred embodiments of the present disclosure and not used to limit the present disclosure, and for one skilled in the art, various modifications and changes may be made to the present disclosure. Any modifications, equivalent substitutions, improvements and so on made within the spirit and principle of the present disclosure, should be covered within the scope of protection of the present disclosure. It should be noted that similar reference signs and letters represent similar items in the following drawings, therefore, once a certain item is defined in one drawing, it is not needed to be further defined or explained in subsequent drawings.

The above-mentioned are merely specific embodiments of the present disclosure, but the scope of protection of the present disclosure is not limited thereto, and any modification or substitution that may be easily envisaged by those skilled in the present art within the technical scope disclosed in the present disclosure should fall within the scope of protection of the present disclosure. Therefore, the scope of protection of the present disclosure should be based on the scope of protection of the claims.

INDUSTRIAL APPLICABILITY

For the communication relationship establishing method, the communication relationship establishing device, the computer readable storage medium, the electronic device and the cleaning device provided in the embodiments of the present disclosure, the to-be-cleaned region is divided by the boundary line, and after the division, the communication relationship between the to-be-cleaned subregion obtained from the division and the original small to-be-cleaned subregion is established, so as to provide a basis for establishing the cleaning sequence of the cleaning robot, and solve the problem that the cleaning sequence of the existing cleaning robots is out of order, which easily causes redundant cleaning.

What is claimed is:

1. A method for establishing a communication relationship, wherein the method comprises: on a cleaning robot:
    dividing a to-be-cleaned region into at least two to-be-cleaned subregions;
    classifying, according to an area, the at least two to-be-cleaned subregions into at least one large to-be-cleaned subregion and at least one small to-be-cleaned subregion;
    acquiring a boundary line between the at least one large to-be-cleaned subregion and the at least one small to-be-cleaned subregion;
    extending the boundary line, and determining whether an extended boundary line is capable of dividing the at least one large to-be-cleaned subregion, wherein if yes, a first to-be-cleaned subregion located at a side of the boundary line same as the at least one small to-be-cleaned subregion and a second to-be-cleaned subregion located at a side of the boundary line different from the at least one small to-be-cleaned subregion are acquired; and
    establishing a communication relationship between the at least one small to-be-cleaned subregion and the first to-be-cleaned subregion, and establishing a communication relationship between the at least one small to-be-cleaned subregion and the second to-be-cleaned subregion,
    wherein the dividing a to-be-cleaned region into at least two to-be-cleaned subregions comprises:
        establishing a mapping relationship between the to-be-cleaned region and a grid map;
        acquiring a certain uncleaned grid in the to-be-cleaned region as a seed point, and taking a region where the seed point is located, as the first to-be-cleaned subregion;
        acquiring a column where the seed point is located, and determining whether an uncleaned grid corresponding to the grid map is present in the column where the seed point is located, wherein if yes, the uncleaned grid is added to the first to-be-cleaned subregion;
        acquiring an adjacent column of the current column, and determining whether an uncleaned grid corresponding to the grid map is present in the adjacent column, wherein if yes, the uncleaned grid is added to the first to-be-cleaned subregion; and
        repeating the step of acquiring an adjacent column of the current column, and determining whether an uncleaned grid corresponding to the grid map is present in the adjacent column, wherein if yes, the uncleaned grid is added to the first to-be-cleaned subregion, until no uncleaned grid is present, so as to complete an establishment of the first to-be-cleaned subregion.

2. The method according to claim 1, wherein the method further comprises:
    determining, if a cleaning of a current region is completed, whether an uncleaned region is present among regions communicated with the current region, wherein if yes, it is determined whether the current region is the small to-be-cleaned subregion, wherein if yes, a region with a smallest area to clean is selected from uncleaned regions communicated with the current region.

3. The method according to claim 2, wherein after determining whether the current region is the small to-be-cleaned subregion, the method further comprises:
    selecting, if the current region is not the small to-be-cleaned subregion, a region closest to a current position to clean from the uncleaned regions communicated with the current region.

4. The method according to claim 2, wherein after determining whether an uncleaned region is present among regions communicated with the current region, the method further comprises:
    returning to a previous region of the current region if no uncleaned region is present among the regions communicated with the current region, and taking the previous region as a new current region.

5. The method according to claim 1, wherein the method further comprises:
    acquiring, as for each of to-be-cleaned subregions in the to-be-cleaned region, a point of an upper edge and a point of a lower edge of each of the to-be-cleaned subregions, as coverage counter points;
    ordering, before cleaning the to-be-cleaned region, the coverage counter points of each of the to-be-cleaned subregions according to communication relationships among individual to-be-cleaned subregions in the to-be-cleaned region; and
    cleaning each of the to-be-cleaned subregions in the to-be-cleaned region according to the ordering.

6. A method for establishing a communication relationship, wherein the method comprises: on a cleaning robot:
    dividing a to-be-cleaned region into at least two to-be-cleaned subregions;
    classifying, according to the areas thereof, the at least two to-be-cleaned subregions into at least one large to-be-cleaned subregion and at least one small to-be-cleaned subregion;
    acquiring, as for each of the at least one small to-be-cleaned subregion, a boundary line of a small to-be-cleaned subregion, and determining whether one side of the boundary line, which is opposite to the small to-be-cleaned subregion, is a large to-be-cleaned subregion, wherein if yes, the boundary line is extended; and
    determining whether an extended boundary line is capable of dividing the large to-be-cleaned subregion into at least two regions, wherein if yes, communication relationships between the at least two regions and the small to-be-cleaned subregion are established respectively; and
    marking the at least two regions as large to-be-cleaned subregions, respectively,
    wherein the dividing a to-be-cleaned region into at least two to-be-cleaned subregions comprises:
        mapping the to-be-cleaned region to a grid map;

acquiring any uncleaned grid in the to-be-cleaned region as a seed point, and establishing a to-be-cleaned subregion including the seed point;

acquiring, in the grid map, a column where the seed point is located as a current column, and determining whether an uncleaned grid is present in the current column, wherein if an uncleaned grid is present in the current column, the uncleaned grid is added to the to-be-cleaned subregion; acquiring, in the grid map, an adjacent column of the current column as a new current column; and re-executing the determining whether an uncleaned grid is present in the current column, wherein if no uncleaned grid is present in the current column, the establishment of the to-be-cleaned subregion is completed, and wherein before acquiring any uncleaned grid in the to-be-cleaned region as a seed point, the dividing a to-be-cleaned region into at least two to-be-cleaned subregions further comprises:

determining whether an uncleaned grid is present in the to-be-cleaned region, wherein if yes, the acquiring any uncleaned grid in the to-be-cleaned region as a seed point is executed; and if no, the dividing a to-be-cleaned region into at least two to-be-cleaned subregions is stopped.

7. The method according to claim 6, wherein after completing the establishment of the to-be-cleaned subregion, the method further comprises:

re-executing the determining whether an uncleaned grid is present in the to-be-cleaned region.

8. The method according to claim 6, wherein the method further comprises:

acquiring, as for each of to-be-cleaned subregions in the to-be-cleaned region, a point of an upper edge and a point of a lower edge of each of the to-be-cleaned subregions as coverage counter points;

ordering, before cleaning the to-be-cleaned region, the coverage counter points of each of the to-be-cleaned subregions according to communication relationships among individual to-be-cleaned subregions in the to-be-cleaned region; and cleaning each of the to-be-cleaned subregions in the to-be-cleaned region according to the ordering.

9. The method according to claim 6, wherein the method further comprises:

cleaning each of the to-be-cleaned subregions in the to-be-cleaned region, wherein when completing a cleaning for a current to-be-cleaned subregion, it is determined whether an uncleaned region is present among regions communicated with the current to-be-cleaned subregion, wherein if yes, it is determined whether the current to-be-cleaned subregion is a small to-be-cleaned subregion, wherein if yes, a region with a smallest area to clean is selected from various regions communicated with the current to-be-cleaned subregion.

10. The method according to claim 9, wherein the method further comprises:

selecting, if the current to-be-cleaned subregion is not a small to-be-cleaned subregion, a region closest to a current position to clean from various regions communicated with the current to-be-cleaned subregion.

11. A device for establishing a communication relationship, wherein the device comprises: on a cleaning robot comprising;

a primary subregion dividing module, configured to divide a to-be-cleaned region into at least two to-be-cleaned subregions;

an area distinguishing module, configured to classify, according to the areas thereof, the at least two to-be-cleaned subregions into at least one large to-be-cleaned subregion and at least one small to-be-cleaned subregion;

a boundary line acquiring module, configured to acquire a boundary line between the at least one large to-be-cleaned subregion and the at least one small to-be-cleaned subregion;

a boundary line dividing module, configured to extend the boundary line, and determine whether an extended boundary line is capable of dividing the at least one large to-be-cleaned subregion;

a subregion redividing module, configured to acquire a first to-be-cleaned subregion located at a side of the boundary line same as the at least one small to-be-cleaned subregion and a second to-be-cleaned subregion located at a side of the boundary line different from the at least one small to-be-cleaned subregion; and a communication relationship establishing module, configured to establish a communication relationship between the at least one small to-be-cleaned subregion and the first to-be-cleaned subregion, and establish a communication relationship between the at least one small to-be-cleaned subregion and the second to-be-cleaned subregion, wherein the primary subregion dividing module comprises:

a mapping relationship establishing submodule, configured to establish a mapping relationship between the to-be-cleaned region and a grid map;

a seed point acquiring submodule, configured to acquire a certain uncleaned grid in the to-be-cleaned region as a seed point, and taking a region where the seed point is located, as a first to-be-cleaned subregion;

an uncleaned grid submodule, configured to acquire a column where the seed point is located, and determine whether an uncleaned grid corresponding to the grid map is present in the column where the seed point is located wherein if yes, the uncleaned grid is added to the first to-be-cleaned subregion;

an adjacent column determining submodule, configured to acquire an adjacent column of the current column, and determine whether an uncleaned grid corresponding to the grid map is present in the adjacent column, wherein if yes, the uncleaned grid is added to the first to-be-cleaned subregion; and a region establishment completing submodule, configured to repeat the acquiring an adjacent column of the current column, and determining whether an uncleaned grid corresponding to the grid map is present in the adjacent column, wherein if yes, the uncleaned grid is added to the first to-be-cleaned subregion, until no uncleaned grid is present, so as to complete an establishment of the first to-be-cleaned subregion.

12. The device according to claim 11, wherein the device further comprises:

an uncleaned region determining module, configured to determine whether an uncleaned region is present among regions communicated with a current region;

a small subregion determining module, configured to determine whether the current region is a small to-be-cleaned subregion; and an area selecting module, configured to select, from uncleaned regions communicated with the current region, a region with a smallest area to clean.

13. The device according to claim 12, wherein the device further comprises:

a distance selecting module, configured to select, from the uncleaned regions communicated with the current region, a closest region to clean.

14. The device according to claim 11, wherein the device further comprises:

a region returning module, configured to return to a previous region of the current region if no uncleaned region is present among the regions communicated with the current region, and take the previous region as a new current region.

15. The method according to claim 6, wherein the method further comprises:

acquiring, as for each of to-be-cleaned subregions in the to-be-cleaned region, a point of an upper edge and a point of a lower edge of each of the to-be-cleaned subregions as coverage counter points;

ordering, before cleaning the to-be-cleaned region, the coverage counter points of each of the to-be-cleaned subregions according to communication relationships among individual to-be-cleaned subregions in the to-be-cleaned region; and cleaning each of the to-be-cleaned subregions in the to-be-cleaned region according to the ordering.

* * * * *